United States Patent [19]
Hartley

[11] Patent Number: 5,354,154
[45] Date of Patent: Oct. 11, 1994

[54] ATTACHMENT OF A TAPPING HEAD TO A DRIVE UNIT

[76] Inventor: Robin Hartley, 4082 Epanow Ave., San Diego, Calif. 92117

[21] Appl. No.: 946,968

[22] Filed: Sep. 17, 1992

[51] Int. Cl.$^5$ .............................................. B23B 47/00
[52] U.S. Cl. .................................. 408/139; 408/241 B
[58] Field of Search ..................... 408/241 B, 139, 140, 408/72 R, 72 B, 181, 182

[56] References Cited

U.S. PATENT DOCUMENTS

| | | | |
|---|---|---|---|
| 318,654 | 5/1885 | Rathbun | 408/139 |
| 466,946 | 1/1892 | Hurley | 408/139 |
| 2,292,850 | 8/1942 | Sundstrand | 408/72 |
| 2,370,770 | 3/1945 | Basta | 408/72 |
| 2,401,490 | 6/1946 | Little | 408/72 |
| 5,131,794 | 7/1992 | Johnson | 408/139 |

OTHER PUBLICATIONS

United Catalog, "Keep It Straight!", Jun. 1973, p. 31.
L. Brydolf, "Machinist has an ace up his sleeve", *San Diego Business Journal*, May 3, 1993, p. 8.
Anon., "Armless Tapping Attachment Sleeve Introduced", *Metalworking Digest*, May 1993.
Catalog of Tapmatic Corporation, pp. 1–3, 32–33, and 39 (undated).

*Primary Examiner*—Mark Rosenbaum
*Assistant Examiner*—John M. Husar
*Attorney, Agent, or Firm*—Gregory Garmong

[57] ABSTRACT

A stabilizing support attaches a tapping head to a drive having a spindle rotatable within a quill. The support includes a substantially cylindrically symmetric hollow tubular housing axially divided into two sections. A first section has a first bore sized to slip over and lock to a quill of the rotating drive, and a second section having a second bore sized to receive the tapping head therein in a close sliding fit. The housing is releasably locked to the drive quill, and a nonrotating portion of the tapping head is fixed to the housing to prevent its rotational movement relative to the housing.

13 Claims, 1 Drawing Sheet

ATTACHMENT OF A TAPPING HEAD TO A DRIVE UNIT

This invention relates to machine tools, and, more particularly, to a stabilizing support that attaches a tapping head to a drive unit such as a drill press or milling machine.

A commonly performed machining operation is the drilling and tapping of threaded holes in metals and other materials. When two parts are to be attached by a threaded fastener such as a screw, a hole is drilled in one of the parts and thereafter threaded to the required thread diameter and pitch of the fastener. The parts are assembled with the fastener threaded into the tapped hole, and the fastener is tightened to hold the parts together and in place.

In earlier practice, holes were tapped manually with a tap held in a tap wrench or in the chuck of a lathe. More recently, power driven tapping heads have been developed. The tapping head includes a drive shaft and a gear train that transfers the drive force to a tap. The gear train reduces the turning speed to the proper value for the tapping operation, permits the drive to be reversed to back the tap out of the hole, and provides a torque-limiting feature that prevents the force being applied to the tap from exceeding some preselected limit. Such tapping heads increase the productivity of machinists substantially, and are used in machine shops throughout the United States and the rest of the world. Power tapping heads are available in a range of sizes and features from Tapmarie Corp., Irvine, Calif.

The tapping head typically has an input head that attaches to the spindle of the drive, an output tap collet which receives the tap, a torque shaft, and a diametrically enlarged body that contains the gear train. A torque reaction arm extends from the torque shaft, and is reacted against some stationary structure when the tapping head is used. In operation, the input head, output tap collet, and body rotate with the spindle of the drive, and the torque shaft remains rotationally fixed. The drive torque from the drive unit would cause the entire tapping unit to turn if the torque shaft were not held fixed by the torque reaction arm.

Each time the tapping head is used, during setup the machinist must find or rig a structure against which the torque reaction arm can react. If the part to be tapped is large and irregular, it may be necessary to make a clamped arrangement to a nearby piece of structure or to the part itself. The rigging of the torque arm reaction structure typically requires 10–15 minutes for many types of jobs.

One approach to improving the productivity of machinists by reducing the setup time is a quill-mounted torque bar that extends downwardly from the quill of the drive unit to the torque reaction arm. The torque reaction arm of the tapping head reacts against the torque bar. This approach, while operable, has the disadvantages that it is not robust, limits the depth of blind holes that can be tapped, and may adversely affect the operating life of the tapping head.

There is therefore a need for an improved approach to the tapping of holes using a power tapping head. The approach must be convenient to use, safe, and desirably improves the performance of the tapping head. The present invention fulfills this need, and further provides related advantages.

SUMMARY OF THE INVENTION

The present invention provides a stabilizing support for attaching a tapping head to a drive having a spindle rotatable within a quill. The support provides a symmetric, stable structure against which the torque of the tapping head can react. The support is readily installed to a drive, and can be provided in various lengths, special configurations, and extensions to permit specialty deep tapping operations. The support has the additional important advantage of reducing tapping runout of the tapping head, which becomes a significant problem for tapping heads that are worn after use.

In accordance with the invention, such a stabilizing support comprises a substantially cylindrically symmetric hollow tubular housing axially divided into two sections. A first section has a first bore sized to slip over and lock to a quill of a rotating drive, and a second section has a second bore sized to receive a tapping head therein in a close sliding fit. There is additionally a first means for releasably locking the housing to the drive quill and a second means for releasably locking a nonrotating portion of the tapping head to the housing. The first means preferably includes a single axially oriented slot through a wall of the first section and a releasable clamp spanning the slot. The second means preferably includes a plate that engages the nonrotating portion of the tapping head and fastens to an end of the second section.

More generally, a stabilizing support for attaching a tapping head to a drive comprises means for mounting a tapping head to a drive and for preventing a portion of the tapping head from rotating with respect to a quill of the drive, and means for preventing runout of a rotatable tap of the tapping head with respect to an axis of rotation of the drive. The second section of the preferred stabilizing support prevents the tapping head from vibrating about its axis in the fashion of a runout, thereby stabilizing the tap to rotate about the proper axis of rotation. Such runout can cause irregularities in the threaded hole, and typically results from wear of the bearings in the tapping head after a period of use.

The tapping head is readily mounted to the stabilizing support by sliding it into the second section and attaching it to the second section, preferably with an end plate that fastens to the tapping head at the location where in the prior approach the torque reaction arm was attached. The torque is thereby reacted uniformly, not through the asymmetric torque reaction arm that was previously used. It is expected that the useful life of the head and taps will thereby be lengthened. The stabilizing support is readily attached to the drive unit, preferably with the split housing/clamp approach or other convenient structure.

The stabilizing support permits the tapping of holes that cannot be tapped by a tapping head using a conventional torque reaction arm that reacts with a torque bar mounted to the quill. The quill-mounted torque bar, where used, is displaced laterally from the axis of the drive spindle by about 4–5 inches. As a result, the tapping head cannot be used for tapping blind holes that are at the center of the bottom of a deep recess having a diameter of less than about 10 inches. This situation is encountered fairly frequently, and necessitates the use of manual taps. The present invention permits the tapping head to be used in arbitrarily deep recesses that are only about ½ inch or so larger in diameter than the body of the tapping head. Stated alternatively, the prior approach of a torque bar mounted to the quill of the drive necessitated that the stop of the quill be set quite short, so that the torque reaction arm would always engage the torque reaction bar extending downwardly from the quill. There is no such limitation for the present approach.

The stabilizing support of the invention is therefore easily used by machinists in a machine shop environment. It speeds machining operations by reducing setup times, and produces improved results by eliminating runout of the tapping head. It also increases the range of usefulness of the tapping head, by permitting the tapping of blind holes at the bottom of small-diameter recesses. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
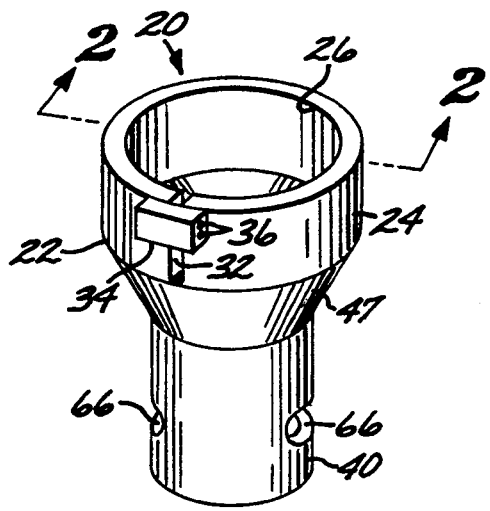
FIG. 1 is a perspective view of a stabilizing support in accordance with the invention.
Figure 2:
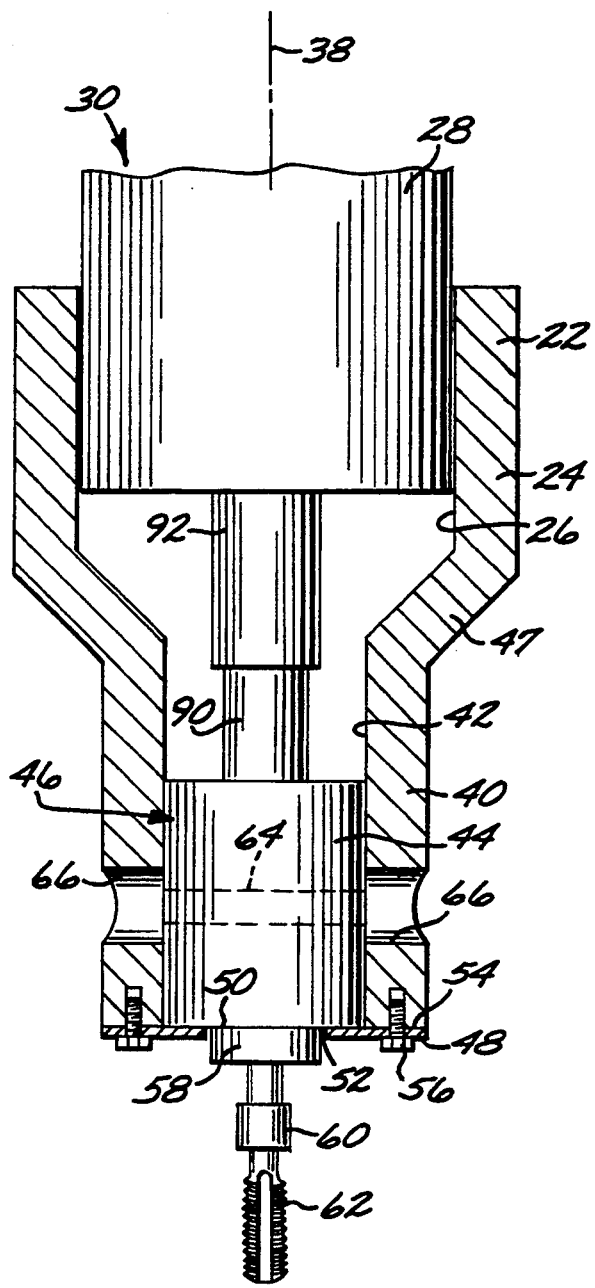
FIG. 2 is a schematic sectional view of the stabilizing support of FIG. 1, taken along line 2—2, and further including the tapping head and the interconnection to a drive unit.

FIG. 1 depicts a stabilizing 20 support of the invention, and FIG. 2 shows the stabilizing support 20 mounted on a milling machine and with a tapping head in place. The stabilizing support 20 is formed of a substantially cylindrically symmetric hollow tubular housing 22.

The housing 22 is divided into two sections. A first section 24 has a cylindrical first bore 26 whose diameter is sized to slip over and lock to a cylindrical quill 28 of a drive unit 30, here indicated generally in FIG. 2 as a vertical milling machine. (The quill of a milling machine is the rotationally fixed portion of the drive in which the spindle rotates, and that is moved axially as the drilling or tapping operation progresses.)

The first section has a single axially oriented slot 92 through the wall of the housing 22. A clamp $4 on the exterior of the housing 22 bridges across the slot 32. The clamp 34 is depicted as a form which is tightened by rotation of bolts 36, but could be an overcenter or other type of locking arrangement. The clamp 94 draws the sides of the slot 92 together as it is tightened, thereby fixing the stabilizing support 20 to the quill 28. Since the first bore 26 and the quill 28 are both cylindrically symmetric, the locking of the stabilizing support 20 to the quill 28 readily results in a perfect alignment of the stabilizing support 20 along an axis of rotation 98 of the drive unit 30.

The housing 22 further includes a second section 40 having a cylindrical second bore 42 whose diameter is sized to receive a body 44 of a tapping head 46 in close sliding fit. The second section 40 is Joined to the first section 24 by an angled transition portion 47 of the housing 22. A torque shaft 58 of the tapping head 46 is fixed to the second section 40 of the housing 22, and thence to the stabilizing support 20, by a plate 48. The plate 48 engages the torque shaft 58 with ears 52 and is fixed to an end 54 of the second section 40 with machine screws 56. A tap collet 60 of the tapping head 46 extends downwardly from the center of the torque shaft 58, and receives the tap 62 therein.

Most commercially available tapping heads such as that depicted as the tapping head 46 have a torque-limiting adjustment ring 64 on the body 44. To permit operation of the ring 64 when the tapping head 46 is within the housing 22, a pair of oppositely disposed windows 66 are provided in the second section 40.

The diameter of the second bore 42 is sized to be Just slightly greater than the outer diameter of the body 44 of the tapping head 46, for two reasons. First, the close fit holds the tapping head 46 firmly, so that the tap 62 is aligned precisely along the axis of rotation $8. This fixing of the axis of rotation of the tap 62 is important, particularly when the tapping head 46 has been used for a period of time and its own internal bearings are worn. In the absence of the stabilization of the present approach, the tap 62 of such a worn tapping head 46 vibrates away from the intended axis of rotation 38, resulting in a phenomenon termed "runout". The runout interferes with, and may in severe instances prevent, the formation of a true set of precision threads. The present stabilizing support prevents runout due to the close fit of the tapping head 46 with the second bore 42, thereby producing a better quality tapped hole. The second reason for the close fit between the tapping unit body 44 and the second bore 42 is so that the operator cannot catch his fingers between the body 44 and the second bore 42 as the tapping head 46 rotates within the second bore 42.

Figure 3:
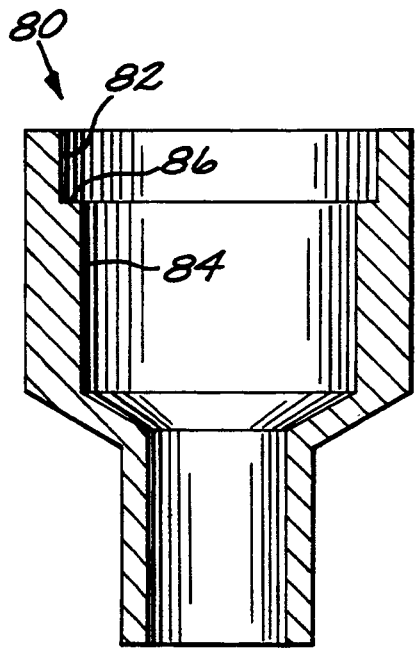
FIG. 3 is a sectional view of another embodiment of the stabilizing support.

The stabilizing support 20 of FIGS. 1 and 2 is designed for use with a quill 28 of one particular diameter, available from one particular manufacturer. Various drives have different sized quills. A stabilizing support 80 of FIG. 3 is identical to the stabilizing support 20, except that it has two cylindrical first bores 82 and 84, separated by a shoulder 86. If the quill of one type of drive has a larger diameter, the stabilizing support 80 slides onto the quill only up to the shoulder 86 so that the contact is along the bore 82. If the quill of another type of drive has a smaller diameter, the stabilizing support 80 slides onto the quill past the shoulder 86 so that the contact is along the bore 84. Since there are only a few different quill diameters on milling machines, the stabilizing support 80 can be sized accordingly.

It is within the scope of the invention to provide a means by which different sizes of tapping head bodies could be fixed within the second bore 42. For example, diameter-adjusting inserts could be used. However, that approach is not preferred, as the removal of one type of tapping head, insertion of an insert or the like, and attachment of a second type of tapping head would require additional setup time. There is also the possibility of misalignments during such setup operations. Instead, it is preferred to utilize a stabilizing support having a second bore individually sized for each tapping unit. Thus, a machinist who uses two different tapping units would normally have each mounted in its own stabilizing support, which could be quickly fixed to a drive when power tapping was required.

It is further within the scope of the invention to utilize second sections of various outer diameters and lengths, and to provide extensions to the second section as needed to reach into deep recesses. If a blind hole is to be tapped at the bottom of a deep recess, the second section can be made as long as necessary so that the tap can reach to the bottom of the recess. If a blind hole is to be tapped at the bottom of a deep recess whose diameter is barely larger than the outer diameter of the body of the tapping head, the wall thickness of the second section may be made quite thin. It will be appreciated that this is not the preferred case, because the second section should be sufficiently robust for general use. Nevertheless, in a special situation a long, thin-walled second section may be carefully employed.

The invention is utilized by first mounting the tapping head 46 in the second bore 42 using the plate 48, with a shaft 90 of the tapping head 46 extending upwardly into the interior of the first section 24. This unit is then mounted to the drive, such as a milling machine or drill press, by slipping the first section 24 over the quill 28 and tightening the clamp 34. The shaft 90 is fixed to a rotating spindle 92 of the drive with the threaded connection provided on each.

After the stabilizing support 20 and its tapping head 46 are thus mounted to the drive, holes in a workpiece (not shown) are tapped with the tapping head in the usual manner.

A prototype of the present stabilizing support has been constructed with a first bore diameter of 3.330 inches to fit the quill of a Lagun milling machine, and a second bore diameter of 1.900 inches to receive a Tapmatic Model 30X tapping head. The stabilizing support and tapping head operated as described herein. Both relatively new and relatively worn tapping heads were tested. Both were operable with the invention. Setup time was reduced to less than 30 seconds from the conventional 10–15 minutes usually required for placement of a torque reaction structure. It was further observed that the worn tapping head had substantial runout when used without the stabilizing support, resulting in a reduction of the quality of the threading in tile workpiece. When the same worn tapping head was used with the stabilizing support of the invention, runout was reduced to virtually zero. The quality of the threaded hole using the thus-supported worn tapping head was the same as that of a new tapping head, thus effectively prolonging the useful life of the tapping head. Tests were made to demonstrate that blind holes could be tapped at the center of deep recesses only slightly larger in diameter than the outer diameter of the second section. In this case, the second section had a diameter of Just under 2 ½ inches, and blind holes could be tapped at the center of the bottom of a deep recess having a diameter of about 2 ½ inches (or more).

Although a particular embodiment of the invention has been described in detail for purposes of illustration, various modifications may be made without departing from the spirit and scope of the invention. Accordingly, the invention is not to be limited except as by the appended claims.

What is claimed is:

1. A stabilizing support for attaching a tapping head to a drive having a spindle rotatable within a quill, the tapping head comprising a rotating portion and a nonrotating portion, the stabilizing support comprising:
    a substantially cylindrically symmetric hollow tubular housing axially divided into two sections
    a first section having a first bore sized to slip over and lock to a quill of a rotating drive, and
    a second section having a second bore sized to receive a tapping head therein in a close sliding fit;
    first means for releasably locking the housing to the drive quill; and
    second means for releasably locking the nonrotating portion of the tapping head to the housing and for permitting the rotating portion of the tapping head to turn freely relative to the housing while holding the nonrotating part stationary against rotational movement.

2. The support of claim 1, wherein the first bore has a substantially constant diameter throughout its length.

3. The support of claim 1, wherein the first bore has two diameters along its length, and a shoulder therebetween, the two diameters being sized to slip over and lock to the quills of different types of drives.

4. The support of claim 1, wherein the second section has a window therein so that a portion of the tapping head is accessible from the exterior of the support.

5. The support of claim 1, wherein the first means includes a single axially oriented slot through a wall of the first section.

6. The support of claim 5, wherein in first means is a releasable clamp spanning the slot.

7. The support of claim 1, wherein the second means is a plate that engages the nonrotating portion of the tapping head and fastens to an end of the second section.

8. A stabilizing support for attaching a tapping head to a drive, comprising:
    means for mounting a tapping head to a drive and for preventing a portion of the tapping head from rotating with respect to a quill of the drive; and
    means for preventing runout of a rotatable tap of the tapping head with respect to an axis of rotation of the drive, the means for preventing including a runout section having a runout bore sized to receive the tapping head therein in a close sliding fit.

9. The support of claim 8, wherein the means for mounting includes
    an attachment cylindrical section having an attachment bore sized to slip over the quill of the drive, and
    a releasable lock operable to lock the attachment cylindrical section to the quill of the drive.

10. Apparatus for tapping holes, comprising:
    a drive having a rotatable drive spindle disposed within a quill;
    a tapping head having an outer portion and a rotatable tap shaft therein; and
    a stabilizing support for attaching the tapping head to the drive, comprising
    means for mounting a tapping head to a drive and for preventing a portion of the tapping head from rotating with respect to a quill of the drive, and
    means for preventing runout of a rotatable tap shaft of the tapping head with respect to an axis of rotation of the drive, the means for preventing including a runout section having a runout bore sized to receive the tapping head therein in a close sliding fit.

11. The apparatus of claim 10, wherein the drive is a drill press.

12. The apparatus of claim 10, wherein the drive is a milling machine.

13. The apparatus of claim 10, wherein the means for mounting includes
    an attachment cylindrical section having an attachment bore sized to slip over the quill of the drive, and
    a releasable lock operable to lock the attachment cylindrical section to the quill of the drive.

* * * * *